No. 757,597. PATENTED APR. 19, 1904.
C. W. CALDWELL.
ROD PACKING.
APPLICATION FILED JULY 25, 1901. RENEWED OCT. 8, 1903.
NO MODEL.
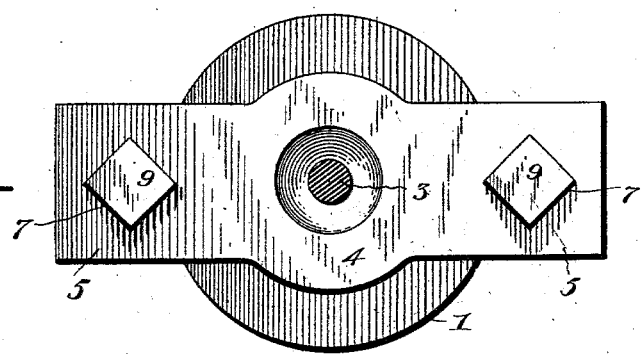
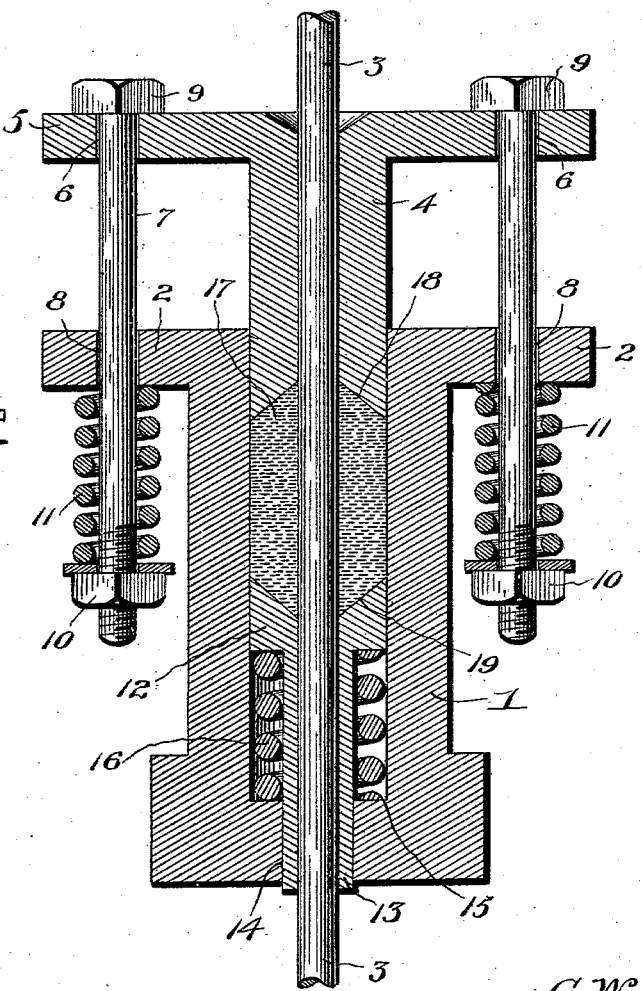
Inventor
C. W. Caldwell No. 757,597.

Patented April 19, 1904.

UNITED STATES PATENT OFFICE.

CLARENCE W. CALDWELL, OF PORTAGE, OHIO.

ROD-PACKING.

SPECIFICATION forming part of Letters Patent No. 757,597, dated April 19, 1904.

Application filed July 25, 1901. Renewed October 8, 1903. Serial No. 176,313. (No model.)

*To all whom it may concern:*

Be it known that I, CLARENCE W. CALDWELL, a citizen of the United States, residing at Portage, in the county of Wood and State of Ohio, have invented certain new and useful Improvements in Rod-Packing; and I do declare the following to be a full, clear, and exact description of the invention, such as will enable others skilled in the art to which it appertains to make and use the same.

My invention relates to a stuffing-box or rod-packing for the rods of oil-wells, pistons, and the like.

The object of the invention is to provide a packing of this character which is simple, cheap, and durable and which will effectually prevent the access of foreign materials to the gland containing the packing.

With this and other objects in view the invention consists of certain novel features of construction, combination, and arrangement of parts, as will be hereinafter more fully described, and particularly pointed out in the appended claims.

In the accompanying drawings, Figure 1 is an end elevation of a stuffing-box or rod-packing embodying my invention, and Fig. 2 is a longitudinal section of the same.

Referring now more particularly to the drawings, the numeral 1 designates the body of the stuffing-box, which is of suitable form and size and is provided at one end with oppositely-projecting flanges 2 or in lieu thereof with a continuous annular flange, for a purpose presently described.

3 designates the piston or other rod which works through the box. The rod 3 projects through a gland 4, which is slidably fitted in the end of the stuffing-box having the flange or flanges 2 and is provided at its outer end with a cross-head 5, having openings 6 for the passage of bolts 7, which also extend through corresponding openings 8 in the flange or flanges 2. The outer ends of these bolts are provided with heads 9, which bear against the outer surface of the cross-head 5, and upon the inner end of said bolts are adjusting-nuts 10, against which bear pressure-springs 11, which encompass the inner ends of the bolts between the said adjusting-nuts 10 and the flange or flanges 2 and exert pressure upon the gland 4 to maintain it in position and to cause it to slide inwardly within the box 1 to press the packing against the rod and follower.

The follower 12 works within the box 1, opposite the gland 4, and is provided with a tubular stem 13, through which the rod 3 projects and which extends to the exterior through a contracted opening 14 in the opposite end of the box from that in which said gland is fitted, the wall of said opening forming a seat or shoulder 15, against which bears a coil-spring 16, which surrounds the stem 13 between the said seat or shoulder and the follower 12 and presses the follower inward against the packing 17, which is interposed between the same and the gland 4. The springs 11 and 16 thus act to press the gland and follower inwardly to compress the packing and keep it in close contact with the rod 3, and to render this operation more effective I provide the gland 4 and follower 12 with conically-recessed faces 18 and 19, which are adapted to exert a wedging action on the packing 17 to maintain it in a sufficiently-compressed state and in such close contact with the rod 3 as to effectually prevent the access to the space between the gland and follower of any foreign material and to keep the rod in the best possible condition for a smooth and easy operation. The packing will thus be kept in the form of a body having conical ends, against which pressure is brought to crowd said rod against the wall of the box and rod.

It will be observed by reference to Fig. 2 of the drawings that the springs 11 and 16 are counteracting—that is to say, they exert their energy in opposite directions on the gland and follower between which the packing is compressed and cause the gland and follower to compress the packing with equal force at both ends. Moreover, the provision of the counteracting-springs adapts the packing, together with the gland and follower, to move to some extent in either direction with the rod 3, thus causing the packing to be constantly disturbed throughout its entire mass while the rod is in operation, which enables the density of the packing to be increased by the action of the springs as the packing wears in contact with the rod and maintaining its efficiency under all conditions. Furthermore, the counteracting-springs, gland, and follower form a resilient seat for the packing, "livening" the latter and causing it to be constantly disturbed throughout the mass, as before stated. It will be understood that when the tension of the springs 11 is varied by adjusting the nuts 10 the tension of the spring 16 is also varied and this without the necessity of access to said spring 16.

From the foregoing description, taken in connection with the accompanying drawings, the construction, mode of operation, and advantages of the invention will be readily understood, and it will be seen that by employing springs arranged in the manner described to act upon the gland and follower the packing is always maintained in compact form and in close contact with the rod and that all changes in the form of the packing, such as are due to shrinkage, &c., of the packing are speedily met and compensated for.

Various changes in the form, proportion, and minor details of construction may be made within the scope of the invention without departing from the spirit or sacrificing any of the advantages thereof.

Having thus described my invention, what I claim as new, and desire to secure by Letters Patent, is—

1. In a packing of the class described, the combination of a stuffing-box, a rod operative therein, a gland and follower in the rod and movable in both directions therewith and also toward and from each other, a packing pressed between the gland and follower and movable also in opposite directions with the rod, and counteracting-springs pressing the gland and follower toward each other and at opposite ends of the packing, substantially as described.

2. In a packing of the class described, the combination of a stuffing-box, a rod operated therein, a gland and follower in the rod and movable therewith in both directions and also movable toward and from each other, a packing compressed between the gland and follower, said packing being also movable longitudinally in both directions and with the rod, counteracting-springs pressing the gland and follower toward each other and at opposite ends of the packing, and means to vary the tension of the springs, substantially as described.

In testimony whereof I have hereunto set my hand in presence of two subscribing witnesses.

CLARENCE W. CALDWELL.

Witnesses:
L. K. KINGSLAND,
M. A. HEMINGER.